United States Patent [19]

McKie

[11] Patent Number: 4,539,814

[45] Date of Patent: Sep. 10, 1985

[54] HYDRAULIC CARRIAGE DRIVE SYSTEM

[76] Inventor: Robert T. McKie, 2222 Stephen Ave., Boise, Id. 83706

[21] Appl. No.: 584,786

[22] Filed: Feb. 29, 1984

Related U.S. Application Data

[63] Continuation-in-part of Ser. No. 274,818, Jun. 18, 1981.

[51] Int. Cl.³ .............................................. B27B 31/00
[52] U.S. Cl. ....................................... 60/413; 60/414; 60/416
[58] Field of Search .......................... 60/413, 414, 416

[56] References Cited

U.S. PATENT DOCUMENTS

| | | | |
|---|---|---|---|
| 2,665,551 | 1/1954 | Chenault | 60/414 |
| 2,778,193 | 1/1957 | Stockett, Jr. | 60/416 |
| 2,977,763 | 4/1961 | Mercier | 60/416 |
| 4,022,269 | 5/1977 | Segawa | 60/416 |
| 4,335,993 | 6/1982 | Nowak | 91/390 |

Primary Examiner—Robert E. Garrett
Assistant Examiner—John M. Husar
Attorney, Agent, or Firm—Raymond N. Baker

[57] ABSTRACT

A hydraulic drive system includes a pump and averaging accumulator for providing a source of substantially constant pressure hydraulic fluid for reciprocal movement of a piston within a cylinder to move a load such as a sawmill carriage attached to the piston, and a high pressure braking accumulator operable to receive and hold hydraulic fluid under a pressure higher than the pressure of the pump discharge and of the averaging accumulator to conserve energy during deceleration of the piston and load at each end of the piston stroke. The high pressure fluid stored in the braking accumulator during braking is employed to rapidly accelerate the piston and load at the beginning of each subsequent stroke, and a bypass circuit and relief valve may be provided between the accumulators to convey fluid to the averaging accumulator for further conservation of energy upon excessive build up of pressure in the braking accumulator.

14 Claims, 1 Drawing Figure

HYDRAULIC CARRIAGE DRIVE SYSTEM

This is a continuation-in-part of my copending application Ser. No. 274,818, filed June 18, 1981.

FIELD OF THE INVENTION

This invention relates to an improved hydraulic drive system utilizing accumulators for reciprocally driving a heavy load.

DESCRIPTION OF THE PRIOR ART

Hydraulic drive systems are known and widely used for driving loads in a reciprocal path and in which substantial force is required to accelerate the load at the beginning of movement in each direction and substantial energy is absorbed in decelerating the load at the end of movement in each direction. Such systems conventionally employ a double-acting hydraulic cylinder with means supplying hydraulic fluid under pressure selectively to each end of the cylinder to move a piston connected through a rod to the load. Such systems are frequently employed to drive the carriage of a sawmill, one such system being shown for example in U.S. Pat. No. 2,778,193. Although the present invention is useful in other hydraulic drive applications, it is particularly well adapted for use in a sawmill drive system and accordingly will be described herein in connection with such apparatus, it being understood that the invention is not so limited.

Conventionally, in a sawmill operation logs enter the mill on a conveyor and are stored on a deck. The individual logs are then placed on the carriage, secured in position, and moved by the carriage along a fixed track in a reciprocal path past a saw by suitable drive means, typically a cable and drum or a fluid actuated piston. From a stationary starting or loading position adjacent the deck, the log and carriage are accelerated to the desired rate for sawing, then moved at a substantially uniform rate as the log traverses the saw at a sawing station to have a slab or board removed. Near the end of the sawing operation, the log and carriage are decelerated and ultimately stopped after the log has moved completely past the saw. The log and carriage must then be driven in the opposite direction and returned to the starting position where it is again brought to a stop after the log has again cleared the sawing station. The log is then indexed laterally on the carriage to enable a second board to be removed and the process repeated. Because of the heavy weight of the carriage and logs, substantial energy is required both to accelerate and decelerate the carriage at the beginning and end respectively of its movement in each direction. Also, for economical reasons, it is desirable to repeat the cutting procedure as quickly as possible so that extremely large forces are involved in accelerating and braking the carriage.

The most advanced hydraulic drive system currently available commercially for driving a sawmill carriage saves substantial energy by converting a portion of the kinetic energy of the carriage and log supported thereon into potential energy by means of pressurized fluid storage in a surge tank. This prior art system includes a hydraulic fluid reservoir, one or more pumps, and a piping system including a four-way control valve for selectively directing the pressurized fluid from the pump to each end of a long hydraulic cylinder containing a piston mounted on a rod connected to the carriage. Pressurized fluid is directed to either end in the cylinder by the control valve to drive the piston, and thereby the carriage, in either direction at the desired rate. A surge tank is connected in the line between the pump and control valve to store pressurized fluid when the carriage is stationary or moving at a rate not requiring the entire pump output. This surge tank can also accept pressurized fluid from the cylinder to the control valve during braking to thereby convert a portion of the carriage's kinetic energy to potential energy in the form of stored pressurized fluid. Such a system requires drive motors having only about thirty percent of the power required by a comparable-sized hydraulic carriage drive system operating without a surge tank for the pressurized fluid. While this known sawmill drive system represents a great advance in the art, such system still requires relatively large motor drive systems operating at high fluid pressures to provide the necessary power for accelerating the heavy loads and to provide sufficient hydraulic fluid output to maintain the desired speed of operation. Accordingly, it is a primary object of the present invention to provide an improved hydraulic drive system capable of operating at high rates while utilizing less energy than in the prior art systems.

Another object is to provide such a hydraulic drive system capable of operating at high speeds without requiring the use of excessively large hydraulic drive pump motors.

Another object of the invention is to provide an improved hydraulic drive system suitable for driving the carriage of a sawmill and capable of more rapidly accelerating and decelerating the carriage.

Another object is to provide such a hydraulic drive system capable of rapidly accelerating the carriage, and utilizing hydraulic fluid braking for decelerating the carriage and accumulating hydraulic fluid at pressures in excess of maximum pump discharge pressure during the braking operation.

Another object is to provide such a hydraulic drive system in which the high pressure hydraulic fluid accumulated during braking is utilized to rapidly accelerate the carriage in the opposite direction whereby increased operating speeds are achieved without requiring high pressure pumps.

The foregoing objects and advantages are achieved in accordance with the present invention which employs a hydraulic drive system of the general type described above including a hydraulic fluid reservoir, a piston and cylinder assembly, a carriage connected to the piston, a pump for delivering hydraulic fluid under pressure, and a first or averaging accumulator operable to store hydraulic fluid under pressure from the pump. The system also includes a second or braking accumulator operable to receive and hold fluid from the piston and cylinder assembly under pressure in excess of the maximum pump discharge pressure, and valve control means operable to selectively deliver fluid under such high pressure to the piston and cylinder assembly for rapidly accelerating the piston at the start of its movement in each direction within the cylinder. The control valve means is operable to selectively control fluid flow from the averaging accumulator, the braking accumulator and the pump for driving the piston and carriage. A bypass and pressure relief valve may also be connected between the second or braking accumulator and the averaging accumulator to permit the flow of high pressure fluid from the braking accumulator to the averaging accumulator upon a build-up of excessive pressure in the braking accumulator.

DESCRIPTION OF THE DRAWINGS

The foregoing and other features and advantages of the invention will be apparent from the detailed description contained hereinbelow taken in conjunction with the single figure of drawings which is a schematic view of a preferred embodiment of the hydraulic drive system of the present invention employed to drive the carriage of a sawmill.

DETAILED DESCRIPTION OF THE INVENTION

Figure 1:
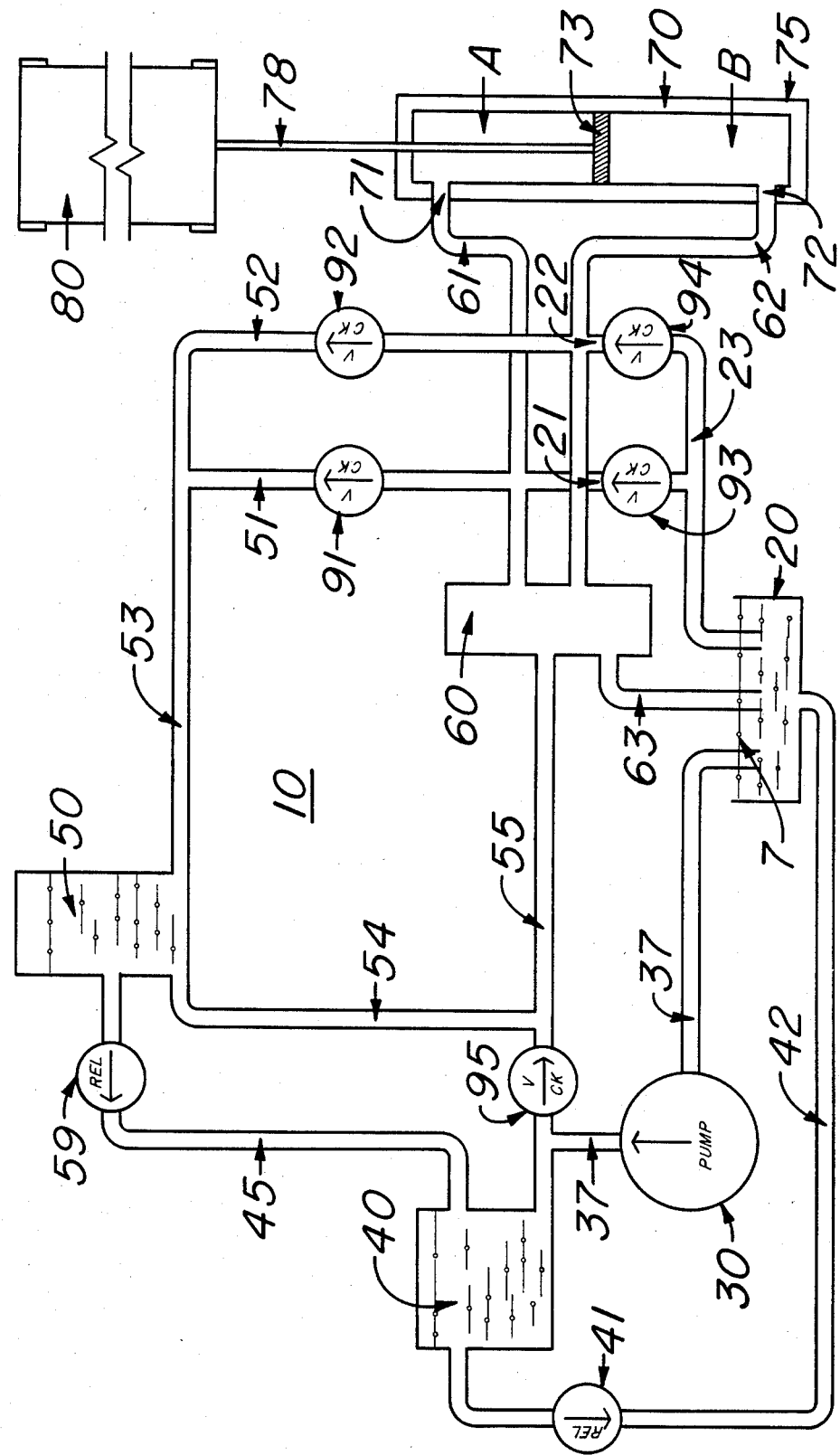

Referring now to the drawing in detail, a preferred embodiment of the invention suitable for driving a sawmill carriage is indicated generally by the reference numeral 10 and includes, generally, a hydraulic fluid reservoir 20, a circulating pump 30, an averaging accumulator 40, a high pressure or braking accumulator 50, valve control means 60, a cylinder and piston assembly 70, and a carriage 80.

Reservoir 20 may be any conventional storage tank and where water is used as the hydraulic fluid, a simple water tap or drain system of suitable capacity may serve as the reservoir. The reservoir serves as a fluid source for pump 30 and preferably as a self-contained storage unit. For operating a conventional hydraulic actuated sawmill, a tank having a capacity of 2500 gallons will normally be adequate. A supply of hydraulic fluid 7 is stored within the reservoir and may be any of the fluids commonly used, the most common used for large volume systems of the type employed in operating a sawmill being water.

Hydraulic fluid 7 is pumped from reservoir 20 through conduit 37 by means of one or more motor driven circulating pumps 30. The number and size of the pumps depends on several factors including the number and size of carriages to be operated from the system, the displacement of the piston drive assembly, and the pressure desired in the averaging accumulator. Because of the averaging effect of accumulator 40 and the accelerating surge of braking accumulator 50, the number and size of the pumps and total horsepower required to drive the pumps will be significantly less than required by the prior art systems as will be more fully explained hereinbelow. Typically, where a single cylinder and piston assembly includes a piston having a 10 inch diameter and a 20 foot stroke, and for averaging accumulator pressures in the range of 100 to 150 psig, a single 75 horsepower pump has been found to be adequate.

Pump 30 delivers fluid to averaging accumulator 40 through conduits 37 and 55 and, under control of valve 60, to piston and cylinder assembly 70. The size of the averaging accumulator required will vary, depending in part on piston displacement and carriage duty, and for most sawmill installations may have a capacity in the range of 1000 to 4000 gallons. Accumulator 40 in one system of the type described above and designed for a known commercial sawmill has a capacity of 2800 gallons and is operable to hold fluid at pressures up to 150 psig. As is known, the averaging accumulator will be provided with an air make-up regulator, not shown, for maintaining the desired percentage of air in the top of the accumulator.

Accumulator 40 is also provided with a pressure relief valve 41 connected in overflow line 42 to permit the flow of pressure fluid back to reservoir 20 when the pressure in the accumulator reaches a predetermined maximum whereby pump 30 may be continuously operated. The averaging accumulator, because of its large capacity and in cooperation with the continuously driven pump, provides a source of substantially constant pressure fluid to cylinder and piston assembly 70. Because of the high surge accelerating effect of braking accumulator 50 on the piston, the averaging accumulator may be pressurized at a level substantially lower than the accumulators of the prior art systems as will be explained more fully hereinbelow. Operating the system, exclusive of the braking accumulator, at a low pressure permits use of a substantially lower pump pressure and results in substantial decrease of energy used. Only a single pump will be required for most installations.

High pressure braking accumulator 50 is adapted to receive fluid from cylinder 75 and to hold fluid at a pressure substantially in excess of the pump discharge pressure, for example 250 psig. Accumulator 50 is in direct fluid communication with the interior of cylinder 75 by means of conduits 51 and 52, respectively, which may unite to form a single conduit 53. A pair of check valves 91, 92 are connected in conduits 51, 52, respectively, to prevent backflow of high pressure fluid from accumulator 50 to cylinder 75. Accumulator 50 is connected by means of conduits 54 and 55 to valve 60 and check valve 95 is provided in conduit 55 in position to prevent backflow of high pressure fluid from accumulator 50 to the low pressure accumulator 40 and to pump 30.

Braking accumulator 50 is also provided with a pressure relief valve 59, preferably connected to averaging accumulator 40 by conduit 45, for relieving the braking accumulator of fluid at a preselected pressure set substantially higher than the setting of relief valve 41 in averaging accumulator 40. In this manner, a portion of the energy represented by any excess of highly pressurized fluid in accumulator 50 is recovered in the averaging accumulator.

Carriage 80 is conventional in the art and is adapted to secure and convey logs past a saw for cutting. The carriage runs on a track typically defined by a V-shaped rectangular rail or rails to keep the carriage and logs secured thereon accurately aligned with the saw. The size of the carriage may, of course, vary depending on the size of logs to be cut, but a typical carriage may weigh approximately 7 to 8 tons and carry a log weighing 1 to 2 tons. The carriage is moved to and fro in a reciprocal movement under control of valve 60 by means of the piston 73 connected to the carriage through rod 78. Piston 73 is contained within the longitudinally extending double-acting cylinder 75 and is adapted for reciprocal movement therein. The closed cylinder is provided with a pair of ports 71, 72 located one adjacent each end of the cylinder. A pair of conduits 61, 62 connected between ports 71, 72, respectively, and valve assembly 60 provide flow paths for pressure fluid to and from the cylinder under control of valve 60.

It will be seen that as pressurized fluid enters cylinder 75 through one port and exits through the other, piston 73 is caused to move in a direction of the port which fluid exits, and vice versa. In so moving, the piston moves the carriage to which it is attached. Conduits 61 and 62 are connected to and in fluid communication with the reservoir 20 by means of a pair of conduits 21, 22, respectively and conduits 21, 22 are provided with check valves 93, 94, respectively, for providing fluid flow to the cylinder from reservoir 20 while preventing the flow of fluid from the cylinder through these check valves to the reservoir. As shown in the drawings, conduits 21 and 22 may combine into a single conduit 23 on the reservoir side of the check valves.

Valve 60 is preferably a variable rate, three position, four-way valve which is connected to conduit 55, outlet conduits 61 and 62, and to reservoir conduit 63. In a first position, valve 60 provides a fluid flow path from conduit 55 to conduit 61 to provide pressure fluid to cavity A of the cylinder and to simultaneously connect conduits 62 and 63 providing a fluid flow path through the valve 60 for draining a cavity B of the cylinder to reservoir 20. In a second, centered or braking position, all fluid flow paths through the valve are closed whereby all pump discharge flows into accumulator 40. In this position of the control valve, any movement of carriage 80, and consequently piston 73, forces fluid from one end of cylinder 75 into braking accumulator 50 while replenishing the other end of the cylinder with fluid drawn by suction from reservoir 20 through conduit 23 and the appropriate check valve 93 or 94. In the third position, valve 60 connects conduit 55 and conduit 62 to provide a fluid flow path through the valve and port 72 to pressurize cavity B of cylinder 75 and to simultaneously connect conduits 61 and 63 to provide a flow path through the valve to drain cavity A to reservoir 20.

In the initial operation of the system, pump 30 will be operated to bring accumulators 40 and 50 up to pump discharge pressure. After a log has been mounted and secured on the carriage 80 in position for cutting, and with the piston 73 positioned in cylinder 75 to locate the carriage 80 at its starting position adjacent the log deck, for example, at the extreme upward travel of the piston 73 as shown in FIG. 1, the initial phase of the operating cycle of the system will be the same as for the prior art system. Thus, moving the valve 60 from the closed or centered position to the first position will connect conduits 55 and 61 to provide a flow path for fluid through port 71 into cavity A of cylinder 75. During this initial operation, pressure fluid is provided directly from operation of pump 30 and simultaneously from averaging accumulator 40 and braking accumulator 50, and acceleration of the carriage will be relatively slow because of the low pressure hydraulic fluid in the system.

As carriage 80 approaches the position where a log supported thereon is moved past the saw to complete a single cut, control valve 60 is moved to its centered or closed position stopping all flow of fluid through the valve. The inertia of the heavy carriage and log will continue to drive piston 73, however, so that fluid in cavity B of cylinder 75 is forced through port 72, line 62, check valve 92, and lines 52, 53 to braking accumulator 50. Since braking accumulator 50 has a relatively small volume, when compared with averaging accumulator 40, pressure in this accumulator quickly increases to apply substantial braking force to the carriage and log. This simultaneously converts the kinetic energy of the moving load to potential energy in the form of high pressure hydraulic fluid. At the same time, unpressurized fluid is drawn through port 71, conduits 61 and 21, check valve 93, and line 23 from reservoir 20 so that the cylinder 75 remains filled with hydraulic fluid. When carriage 80 is brought to a complete stop, flow of high pressure fluid from reservoir 50 back through line 53 is prevented by check valve 20 while flow through line 54 is prevented by check valve 95 connected in line 55 between line 54 and the pump and by the closed control valve 60.

Upon movement of control 60 to the third position connecting line 55 with line 62 and connecting line 61 with drain line 63, the high pressure fluid stored in reservoir 50 will flow through line 54, line 55 and line 62 to rapidly accelerate piston 73 and the carriage 80 connected thereto in the opposite direction. During this rapid acceleration, the high pressure in line 55 maintains check valve 95 closed.

Although the high pressure in accumulator 50 rapidly accelerates carriage 80, the volume of fluid in reservoir 50 is relatively small whereby the high pressure is dissipated as the carriage approaches its desired speed for returning the saw to the starting position for indexing the log laterally in preparation for the next sawing operation. Throughout this initial acceleration during which high pressure fluid from accumulator 50 is employed, fluid from averaging accumulator 40 and pump 30 remain isolated from the carriage drive by the increased pressure maintaining check valve 95 closed. When pressure in accumulator 50 drops to the level of the pump discharge pressure, however, check valve 95 can open and hydraulic fluid can then flow directly from the pump 30 and from averaging accumulator 40 through line 55 to continue to move the piston 73 and carriage 80. In view of the large volume of hydraulic fluid in averaging accumulator 40, continued movement of the piston 73 will be at a substantially uniform rate and the pressure in averaging accumulator 40 will remain substantially constant. It is understood, of course, that although pump 30 continues to operate, some small pressure drop will occur in averaging accumulator 40, and consequently in braking accumulator 50, during this continued movement, although from a practical standpoint this pressure drop is so small that the rate of movement of carriage 80 remains substantially uniform.

When valve 60 is returned to the first position, the cycle will be repeated. Again, as carriage 80 moves past the saw and approaches the end of the sawing operation, valve 60 is moved to the centered position to apply a braking force to the carriage with the increased pressure in cylinder 75 again being stored in braking accumulator 50. During this braking action, carriage 80 will, of course, continue its movement for a time sufficient to complete the sawing operation; however, the relatively high pressure braking action enables a more rapid deceleration and consequently a shorter braking period is required whereby the carriage can be maintained at its efficient sawing rate for a greater period of time and still be stopped very quickly after the log clears the saw, thereby conserving time during braking action as well as conserving time during the acceleration of the carriage in the return direction.

It is believed apparent from FIG. 1 that the system can be operated without moving the control valve 60 to the closed center position during braking. Thus, with the system set to drive the carriage in one direction, valve 60 can be shifted directly to the opposite position opening the valve to connect line 55 with the end of the cylinder 75 toward which the piston 73 is moving. However, the inertia of the carriage and load will quickly increase the pressure back through valve 60 and line 55 to close check valve 95 and permit the high pressure fluid to flow through line 54 to braking accumulator 50. In this mode of operation, however, as soon as carriage 80 comes to a complete stop, the high pressure fluid in accumulator 50 will be connected through control valve 60 to accelerate the carriage in the opposite direction. This is not an undesirable effect at the extended end of the carriage movement after the log has just traversed the saw, but it may be undesirable at the first position where it is normally necessary to stop the carriage for a time sufficient to index the log transversely of the carriage before moving the carriage and log past the saw to sever the next board. Thus, the operator may choose to utilize this second mode of operation at one end of the carriage travel while utilizing the first described procedure at the other end so that with the control valve in the center position, once the carriage is stopped, it will remain stationary until the control valve is again shifted in a direction to move the carriage.

While a preferred embodiment of the invention has been disclosed and described in detail, it is to be understood that the invention is not so limited but rather it is intended to include all embodiments of the invention which would be apparent to one skilled in the art which come within the spirit and scope of the invention.

What is claimed is:

1. A hydraulic drive system comprising:
    a piston assembly including a closed cylinder having a reciprocating piston mounted therein and first and second conduit means connected to said cylinder adjacent opposing ends thereof;
    a rod connected to said piston for reciprocal movement therewith and being adapted for connection to a load to reciprocally move the load along a fixed path;
    an averaging accumulator operable to receive, hold, and dispense hydraulic fluid under pressure;
    a hydraulic fluid reservoir;
    pump means operable to pump fluid from said reservoir to said averaging accumulator;
    a high pressure braking accumulator connected to said first and second conduits and operable to receive and hold fluid from said first and second conduits at a pressure greater than the pressure in said averaging accumulator for braking the piston and a load attached thereto in its respective reciprocal movement within said cylinder, said braking accumulator being operable to selectively deliver fluid under high pressure to said first and second conduits of said cylinder for accelerating the piston in a desired direction; and
    valve means connected to and in fluid communication with said averaging accumulator, said braking accumulator, said pump means, and said first and second conduits of said cylinder; said valve means operable to control fluid flow from said averaging accumulator, said braking accumulator, and said pump means to said first and second conduits selectively for accelerating and driving said piston and a load attached thereto in a desired direction, said valve means including means selectively directing a pressure fluid from said braking accumulator to said first and second conduits only when the pressure in said braking accumulator is higher than the pressure in said averaging accumulator to thereby rapidly accelerate said piston and for simultaneously directing a pressure fluid from said braking accumulator, said averaging accumulator and said pump selectively to said first and second conduits when the pressure in said braking accumulator and averaging accumulator is substantially equal.

2. The apparatus as described in claim 1 wherein said high pressure braking accumulator includes a conduit in fluid communication with said averaging accumulator; and further comprising a relief valve operable to convey excess fluid from said braking accumulator to said averaging accumulator when the pressure in said braking accumulator reaches a preselected pressure which is in excess of the maximum pressure in said averaging accumulator.

3. The apparatus as described in claim 2 wherein said averaging accumulator includes a conduit in fluid communication with said hydraulic fluid reservoir; and further comprising a relief valve operable to convey fluid from said averaging accumulator to said hydraulic fluid reservoir when the pressure in said averaging accumulator exceeds a preselected maximum pressure.

4. The invention defined in claim 3 wherein said control valve means comprises a selectively operable three position, four-way valve.

5. The invention defined in claim 4 wherein said control valve is a variable rate valve.

6. A hydraulic drive system for reciprocally driving a load along a fixed path comprising, in combination,
    pump means operable to deliver hydraulic fluid under pressure,
    an averaging accumulator connected to said pump means for receiving and storing pressure fluid therefrom,
    double acting hydraulic cylinder means for driving the load along said path, said cylinder means including an elongated cylinder having first and second fluid port means located one in each end portion, a piston mounted in the cylinder for reciprocal movement between said first and second port means, and a rod extending through one end of said cylinder and having one end connected to said piston and its other end adapted to be connected to the load for movement therewith,
    first conduit means connected to said first port means and second conduit means connected to said second port means,
    control valve means connected to said first and second conduit means for controlling the flow of pressure fluid to said cylinder selectively through one of said first and second conduit means and simultaneously permitting the flow of fluid from the cylinder through the other of said conduit means to drive said piston,
    third conduit means connecting said control valve means to said averaging accumulator to supply driving fluid through said control valve means and one of said first and second conduit means to selectively drive said piston,
    high pressure braking accumulator means having inlet means and outlet means, said inlet means being connected in fluid communication with said first and said second port means to permit the flow of pressure fluid from said elongated cylinder into said braking accumulator means,
    means connecting said braking accumulator outlet means to said control valve means, and means isolating the high pressure fluid in said braking accumulator means from said pump means and said averaging accumulator,
    said control valve means being operable to block the flow of hydraulic fluid therethrough to brake movement of the load whereby continued movement of said piston and rod and the load connected thereto will force fluid from one end portion of said cylinder into said braking accumulator for storage at a pressure greater than the pressure in said averaging accumulator and to initially direct the stored high pressure fluid to said cylinder to rapidly accelerate said load upon actuation of said control valve means to move the piston in the desired direction and to direct pressure fluid from said braking accumulator and said averaging accumulator to said cylinder to continue moving said piston when the Pressure in said braking accumulator and said averaging accumulator are substantially equal.

7. The invention defined in claim 6 further comprising means preventing the flow of high pressure fluid from said inlet means of said braking accumulator to said first and second port means.

8. The invention defined in claim 7 wherein said means connecting said braking accumulator outlet means to said control valve means includes fourth conduit means connected to said outlet means and connected to said third conduit means at a point between said control valve means and said averaging accumulator and pump means.

9. The invention defined in claim 8 wherein said means isolating the high pressure fluid in the braking accumulator means comprises one way valve means connected to said third conduit means between said fourth conduit means and said averaging accumulator and pump means.

10. The invention defined in claim 9 wherein said control valve means comprises a selectively operable three-position, four-way valve.

11. The invention defined in claim 10 wherein said control valve is a variable rate valve.

12. The invention defined in claim 9 further comprising a reservoir for supplying hydraulic fluid to said pump means, a fifth conduit connected between said averaging accumulator and said reservoir, and first relief valve means connected in the conduit between said averaging accumulator and said reservoir.

13. The invention defined in claim 12 further comprising sixth conduit means connected between said averaging accumulator and said braking accumulator, and second relief valve means connected in said sixth conduit means, said second relief valve being operable to open under pressure substantially higher than the pressure required to open said first relief valve means.

14. In a method of operating a sawmill in which a carriage is reciprocally driven along a fixed path by a hydraulic drive system including a double acting cylinder having its piston connected to the carriage and having its opposed end portions connected through a control valve to an averaging accumulator containing fluid under pressure supplied by a pump with the control being operable to selectively direct fluid under pressure from the averaging accumulator and pump to either end of the cylinder to drive the carriage in the desired direction and operable to connect the other end of the cylinder to the averaging accumulator to brake the carriage and recover energy in the form of pressure fluid returned to the accumulator during braking, the improvement comprising, providing a second accumulator having an inlet and an outlet, connecting the inlet of the second accumulator to the two end portions of the cylinder and connecting the outlet to the control valve to thereby permit fluid under pressure to flow into the second accumulator to maintain a minimum pressure therein equal to the pressure in the averaging accumulator, directing the flow of pressure fluid from the cylinder to the second accumulator during braking while preventing the flow of such fluid from the cylinder to the averaging accumulator to thereby store fluid in the second accumulator at pressure substantially in excess of the pressure in the averaging accumulator during braking, and using the high pressure fluid stored in the second accumulator to accelerate the carriage in the opposite direction after each braking action while maintaining such high pressure fluid isolated from the fluid in the averaging accumulator and from the pump until sufficient fluid from the second accumulator has been used to reduce the pressure therein to a level substantially equal to the pressure in the averaging accumulator, and using pressure fluid from the averaging accumulator and the braking accumulator simultaneously to continue to drive the carriage for the desired distance.

* * * * *